United States Patent [19]
Harkin

[11] Patent Number: 6,002,409
[45] Date of Patent: Dec. 14, 1999

[54] ARBITRATION FOR SHARED GRAPHICS PROCESSING RESOURCES

[75] Inventor: Patrick A. Harkin, Austin, Tex.

[73] Assignee: Cirrus Logic, Inc., Fremont, Calif.

[21] Appl. No.: 08/960,300

[22] Filed: Oct. 29, 1997

[51] Int. Cl.$^6$ .................................................. G06F 13/00
[52] U.S. Cl. ........................ 345/506; 345/526; 709/103; 709/104
[58] Field of Search .......................... 345/418, 501–506, 345/520, 526, 419; 395/670, 673, 674, 677, 678, 561, 569, 737, 738, 856, 858, 860; 709/100, 102–104

[56] References Cited

U.S. PATENT DOCUMENTS

| | | | |
|---|---|---|---|
| 4,583,185 | 4/1986 | Heartz et al. | 364/521 |
| 4,586,038 | 4/1986 | Sims | 340/729 |
| 4,692,880 | 9/1987 | Merz et al. | 364/521 |
| 4,714,428 | 12/1987 | Bunker et al. | 434/43 |
| 4,715,005 | 12/1987 | Heartz | 364/521 |
| 4,727,365 | 2/1988 | Bunker et al. | 340/728 |
| 4,811,245 | 3/1989 | Bunker et al. | 364/521 |
| 4,821,212 | 4/1989 | Heartz | 364/521 |
| 4,825,391 | 4/1989 | Merz | 364/526 |
| 4,855,937 | 8/1989 | Heartz | 364/521 |
| 4,862,388 | 8/1989 | Bunker | 364/521 |
| 4,905,164 | 2/1990 | Chandler et al. | 364/518 |
| 4,958,305 | 9/1990 | Piazza | 364/522 |
| 4,965,745 | 10/1990 | Economy et al. | 364/518 |
| 5,126,726 | 6/1992 | Howard et al. | 340/728 |
| 5,187,754 | 2/1993 | Currin et al. | 382/54 |
| 5,191,642 | 3/1993 | Quick et al. | 395/127 |
| 5,268,996 | 12/1993 | Steiner et al. | 395/126 |
| 5,293,467 | 3/1994 | Buchner et al. | 395/122 |
| 5,357,579 | 10/1994 | Buchner et al. | 382/1 |
| 5,367,615 | 11/1994 | Economy et al. | 395/129 |
| 5,367,632 | 11/1994 | Bowen et al. | 345/518 |
| 5,394,524 | 2/1995 | DiNicola et al. | 345/506 |
| 5,420,970 | 5/1995 | Steiner et al. | 395/133 |
| 5,640,496 | 6/1997 | Hardy et al. | 345/421 |
| 5,701,444 | 12/1997 | Baldwin | 345/506 |
| 5,861,893 | 1/1999 | Strugess | 345/525 |

FOREIGN PATENT DOCUMENTS

WO 96/36011   11/1996   WIPO .............................. G06T 3/00

OTHER PUBLICATIONS

*Based On US App 08/438,860 filed May 10, 1995 (5,798, 762).

Primary Examiner—Ulka Chauhan
Attorney, Agent, or Firm—Robert V. Wilder; Steven A. Shaw

[57] ABSTRACT

A graphics system includes a graphics processor for rendering graphics primitives with a list of display parameters. A host processor generates a display list which includes a XY address for rendering the graphics primitives. A graphics processor which includes an arbitration logic device enables the graphics processor to temporarily arbitrate shared resources to dissimilar graphics drawing engines. The arbitration logic allows data from the dissimilar drawing engines to be prioritized, depending on the configuration of the underlying computer system, for accessing shared resources.

37 Claims, 4 Drawing Sheets

ARBITRATION FOR SHARED GRAPHICS PROCESSING RESOURCES

FIELD OF THE INVENTION

The present invention relates generally to a graphics system for computer systems. More particularly, the present invention relates to a method and apparatus for internally arbitrating graphics resources to dissimilar graphics drawing engines in a graphics processor.

BACKGROUND OF THE INVENTION

Sophisticated graphics packages have been used for some time in expensive computer design and graphics systems. Increased capabilities of graphics controllers and display systems, combined with standardized graphics languages, have made complex graphics functions available in even the most routine applications. For example, word processor, spread sheets and desktop publishing packages now include relatively sophisticated graphics capabilities. Three-dimensional (3D) displays have become common in games, animation, and multimedia communication and drawing packages.

The availability of sophisticated graphics in PCs has driven a demand for even greater graphics capabilities. To obtain these capabilities, graphics systems must be capable of performing more sophisticated functions in less time to process greater amounts of graphical data required by modern software applications. In particular, there is a continuing need for improvements in software and hardware implementations to draw three-dimensional objects using full color, texture mapping and transparency blending.

Improvements have been made in the hardware realm. Graphics processors and accelerators are available with software drivers for handling two dimensional (2D) and three dimensional (3D) graphics applications. Existing prior art graphics systems either support 2D graphics engines or 3D graphics engines to run graphics applications. In either configuration, applications from one configuration are, in many cases, not able to perform satisfactorily in the other. For example, in a 2D system, 3D applications may run slowly and may not have characteristic three dimensional graphics features such as depth values of objects which are displayed in a 2D system.

Similarly, 2D applications running in 3D systems may lack 3D features such as texture, depth values and transparency blending of objects displayed. Consequently, many prior art graphics systems are designed only to support either a 2D application or a 3D application.

The rendering or interpolation of the graphics primitive in graphics applications is very process intensive, especially in 3D graphics, which requires the graphics processor to take control of the computer system bus or establish a dedicated communication link with the CPU. However, since prior art graphics processors do not have system bus mastering capabilities, these graphics processor have to depend on the CPU to handle a bulk of the processing of graphics data in the computer system.

Relying on the CPU to process most of the graphics data means that the graphics processor has to compete with other system resources for the CPU's bus bandwidth. This can be time consuming and may lead to the loss of graphics data from the time the data are processed until displayed on a display screen, depending on the other processes running in the computer system. This may also affect the overall system performance in the computer system if many graphics applications are being run on the system.

Some prior art graphics systems implement both 2D and 3D graphics rendering capabilities in the same graphics processor. In these prior art systems, the graphics processor has a 2D drawing engine which processes 2D graphics data and instructions and a 3D drawing engine which processes 3D data and instructions. Although such prior art systems are configured to handle 2D and 3D graphics data, problems often occur in simultaneously processing 2D and 3D data. Typically when the native applications are running, (i.e. 3D applications in a 3D system and 2D applications in a 2D system), the other graphics applications cannot interrupt the native application until the system has completed processing the native application. Furthermore, many prior art systems have no means of prioritizing graphics operations in the system. Thus, each graphics application will have the same access priority to graphics resources in the computer system. Such a system configuration can therefore have a deleterious effect on the overall system performance of the computer system.

Thus, an arbitration method is needed for of providing a graphics system which can support 2D and 3D graphics operations with prioritizing capabilities to allow an implementation of predetermined priorities in accessing system resources.

SUMMARY OF THE INVENTION

These needs and others are substantially met through provision of a method and a system for optimizing and prioritizing graphics commands processing in a graphics processor. The present invention enables the graphics processor to efficiently use graphics resources in a graphics based computer system in which the graphics processor has bus mastering capabilities and which supports three dimensional (3D) and two dimensional (2D) graphics applications.

A preferred embodiment of the present invention comprises a 2D graphics drawing engine for processing 2D graphics data and instructions, a 3D graphics drawing engine for processing 3D graphics data and instructions and arbitration logic circuitry for determining and prioritizing the processing of 2D applications and 3D applications.

The arbitration logic prioritizes one type of graphics applications operation over another depending on the configuration of the computer system. Although the arbitration logic allows access to graphics resources between the two drawing engines, the arbitration logic enables one drawing engine priority over the other if both engines are triggered at the same time. Thus, in a 2D configured system, 2D applications will have priority over other graphics applications (i.e. 3D applications) if the 2D graphics data and data representing the other graphics type are present in the graphics processor at the same time. Conversely, in a 3D configured system, 3D applications will have priority over other types of graphics applications. The arbitration logic of the preferred embodiment may be incorporated into a common graphics resource such as a datapath in one embodiment of the present invention. The arbitration logic can also be incorporated in the graphics processor as an independent unit.

The arbitration logic preferably includes 2D and 3D registers for storing 2D and 3D graphics data values presented to the 2D and 3D engine respectively. The 2D and 3D registers include register locations the contents of which are set to prioritize data in the graphics processor. In the preferred embodiment, in a 2D configured system, the priority register bit in the 2D register is always set to give 2D graphics applications priority over other types of graphics application to graphics resources in the graphics processor. Alternatively, in another embodiment of the present invention, the 3D priority register bit is always set to give 3D applications priority over other types of graphics applications in the graphics processor.

The arbitration logic also includes interruption logic which interrupts the processing of non-native graphics applications in favor of native applications in the graphics processor. Thus, in a 3D system, the presence of 3D data in the graphics processor causes an interruption of any other graphics applications being processed by the graphics processor in favor of the 3D application.

The arbitration logic further includes comparator logic coupled to the 2D and 3D registers to determine the priority of the contents of these registers. The comparator logic further includes priority resetting logic for resetting priority of data being processed in the graphics processor. A 2D state machine is coupled to the comparator logic to monitor and control 2D operations in the graphics processor. A 3D state machine is also coupled to the comparator logic to monitor and control 3D operations in the graphics processor.

The graphics processor of a preferred embodiment is able to effectively utilize the bus mastering capabilities of the graphics processor while rendering graphics primitives internally and, at the same time, optimizing the internal arbitration for graphics resources.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

In the following detailed description of the present invention, numerous specific details are set forth in order to provide a thorough understanding of the present invention. However, it will be obvious to one skilled in the art that the present invention may be practiced without these specific details or by using alternate elements or methods. In other instances well know methods, procedures, components, and circuits have not been described in detail in order to avoid unnecessarily obscuring various aspects of the present invention.

Some portions of the detailed description which follow are represented in terms of procedures, logic blocks, processing, and other symbolic representations of operations on data bits within a computer system. These descriptions and representations are the means used by those skilled in the art to most effectively convey the substance of their work to other skilled in the art. A procedure, logic block, process etc., is herein, and generally, conceived to be a self-consistent sequence of steps or instructions leading to a desired result. The steps are those requiring physical manipulations of physical quantities. Usually, signals are capable of being stored, transferred, combined, compared, and otherwise manipulated in a computer system. For reasons of convenience, and with reference to common usage, these signals are referred to as bits, values or the like, in the following description.

It is noted that all of these terms are to be interpreted as referencing physical manipulations and quantities and merely convenient labels and are to be interpreted further in view of terms commonly used in the art. Unless specifically stated otherwise as apparent from the following discussions, it is understood that thorough discussions of the present invention, discussions utilizing terms such as "processing' or "computing" or "calculating" or "determining" or "displaying" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers or other such information storage, transmission or display devices.

Figure 1:
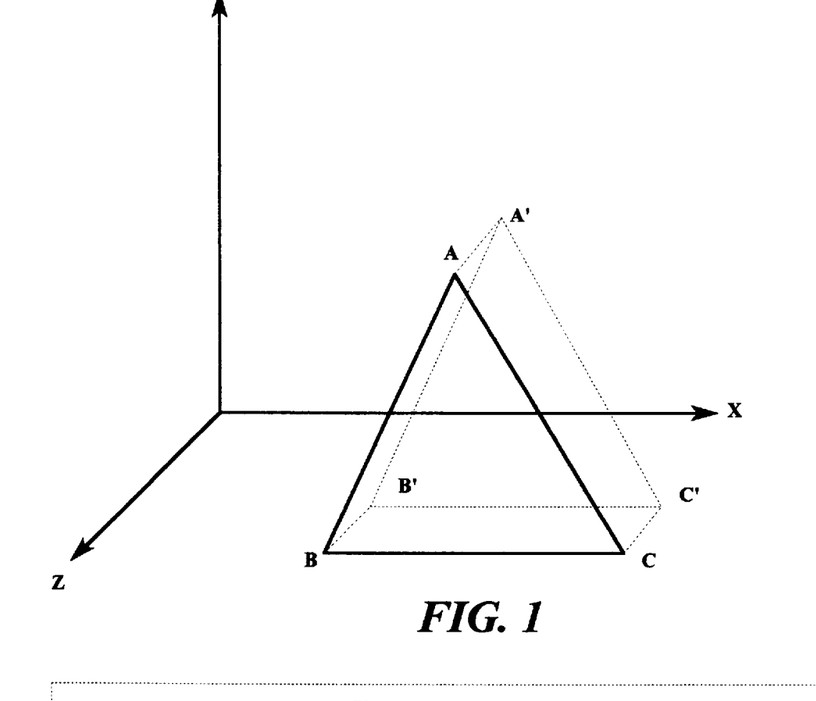
FIG. 1 is a diagram of an exemplary depiction of a two-dimensional (2D) and a three-dimensional (3D) polygon.

FIG. 1 is an illustration of a graphics polygon which may be rendered by a graphics processor. To interpolate a polygon in either a two dimensional (2D) configured computer system or a three dimensional (3D) computer system, the polygon is typically displayed as triangle ABC in a 2D system and as triangles ABC and A'B'C' in a 3D system. In a 2D system, triangle ABC will only have additional features such as color values. However, in a 3D system, depth, texture mapping values and transparency blending values will be provided to the combination of triangles ABC and A'B'C' to provide the 3D perspective.

Figure 2:
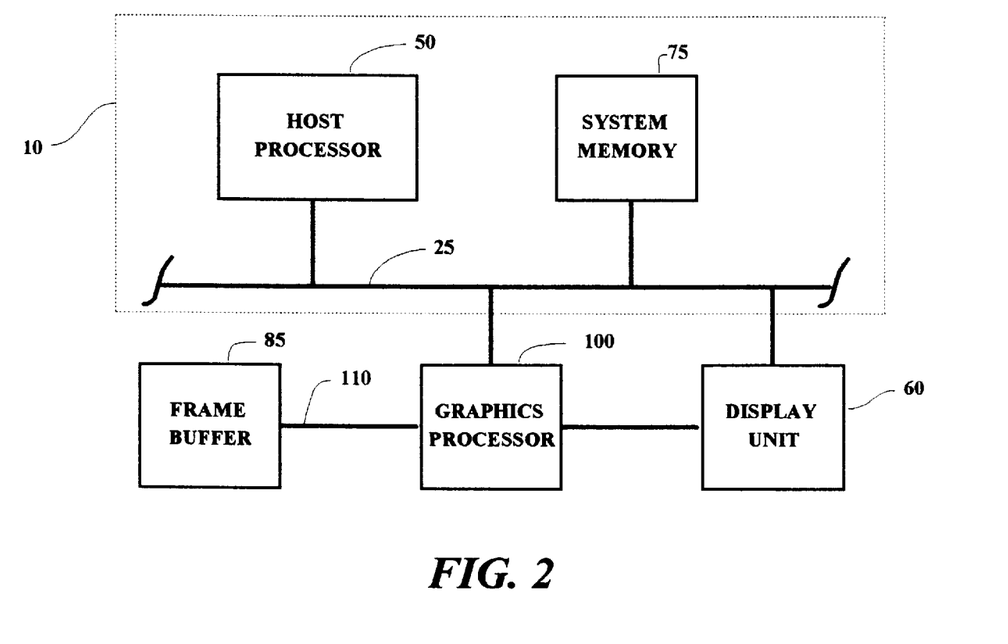
FIG. 2 is a simplified block diagram of a computer system having a graphics processor.

With reference now to FIG. 2, a block diagram is shown of a host computer system 10 used in a preferred embodiment of the present invention. In general, host computer 10 comprises a bus 25 for communicating data and instructions, a host processor (CPU) 50 coupled to bus 25 for processing data and instructions, and a memory unit 75 coupled to bus 25 for storing data and instructions from the host processor 50.

The host processor 50 provides data and control signals via bus 25 to a graphics subsystem. The graphics subsystem includes a graphics processor 100 which executes a series of display instructions found within a display list. The graphics processor 100 supplies data and control signals to a frame buffer 85 which refreshes a display device 60. The display device 60 utilized with the computer system 10 of the present invention can be a liquid crystal device, cathode ray tube, or other display device suitable for creating graphics images and alphanumeric characters recognizable to the computer user.

The particular embodiment shown in FIG. 2 is only one of many possible implementations of a graphics system for use in a computer system. FIG. 2 is simplified for purposes of clarity so that many components and control signals are omitted which are not necessary to understand the present invention.

In a preferred embodiment, the graphics processor 100 provides hardware support for 2D and 3D graphics, and for text and windowing operations of a computer system. The graphics processor 100 transfers digital data from the system memory 75 or host processor 50, and processes data for storage in the frame buffer 85 ultimately for display on the display unit 60. Frame buffer 85 in the exemplary embodiment is a RAMBUS dynamic random access memory (DRAM) device.

The host processor 50 and system memory 75 in the example, communicate with the graphics processor 100 via the system bus 25. The system bus 25 in the example is a peripheral component interconnect (PCI) bus.

Still referring to FIG. 2, the graphics processor 100 couples to the system bus 25. In accordance with the exemplary embodiment, the graphics processor 100 includes bus mastering capabilities, thus permitting graphics processor 100 to "bus master" the system bus 25.

In the exemplary embodiment, the frame buffer 85 comprises a bank of RDRAM buffers, where the digital data stored in the RDRAM comprises a rectangular array of picture elements referred to as pixels or pixel values. Each pixel can be defined by an 8 bit value, for example, which specifies the intensity of a single color of a corresponding pixel on a screen of the display unit 60.

The frame buffer 85 provides a performance improvement by permitting faster access to display list instructions and pixel data, compared to accessing data stored in the main memory 75 of the host computer system 10. The graphics processor 100 communicates with the frame buffer 85 through address data and control lines 110.

Figure 3:
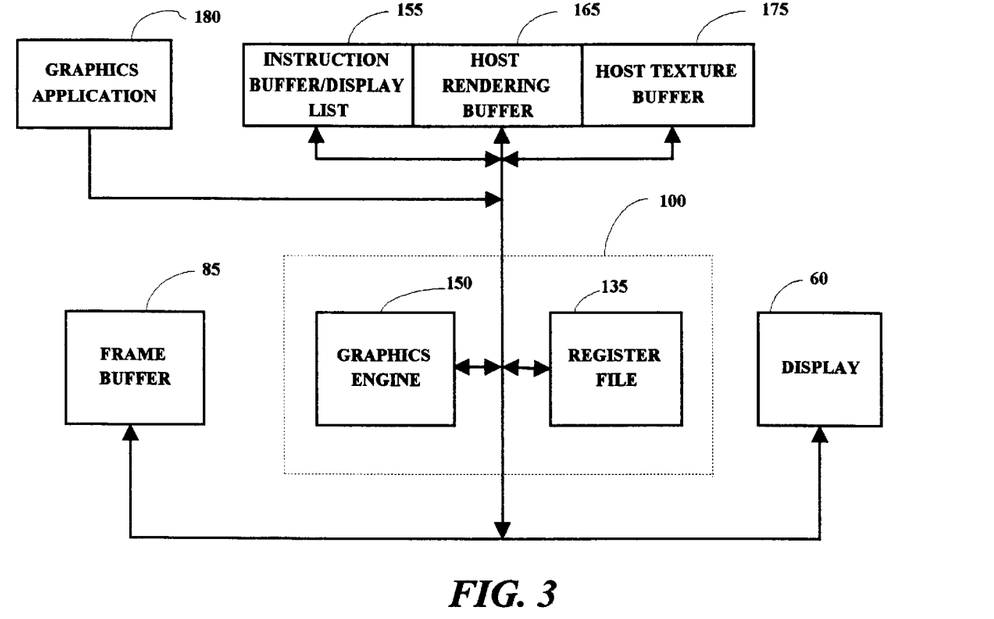
FIG. 3 is a simplified block diagram showing in some detail portions of the graphics processor of FIG. 2.

Referring now to FIG. 3, the graphics processor 100 preferably includes a register file 135 and a graphics rendering engine 150 for rendering three and two dimensional primitives. The system shown in FIG. 3 includes an instruction buffer 155, a host rendering buffer 165 and a host texture buffer 175. Buffers 155,165 and 175 store the instructions and parameters generated by the graphics application 180. As one skilled in the art will understand, buffers 155, 165 and 175 may reside in the processor 50 or system memory 75 of FIG. 2.

Still referring to FIG. 3, the register file 135 receives the instructions and display information from buffer 155 for subsequent use by the graphics rendering engine 150. The graphics rendering engine 150 receives the instructions and display parameters from the register file 135 and generates values for each pixel for rendering on display unit 60. The graphics rendering engine 150 stores the pixel data internally in the graphics processor 100 before rendering the pixels to display unit 60 or to the frame buffer 85.

Figure 4:
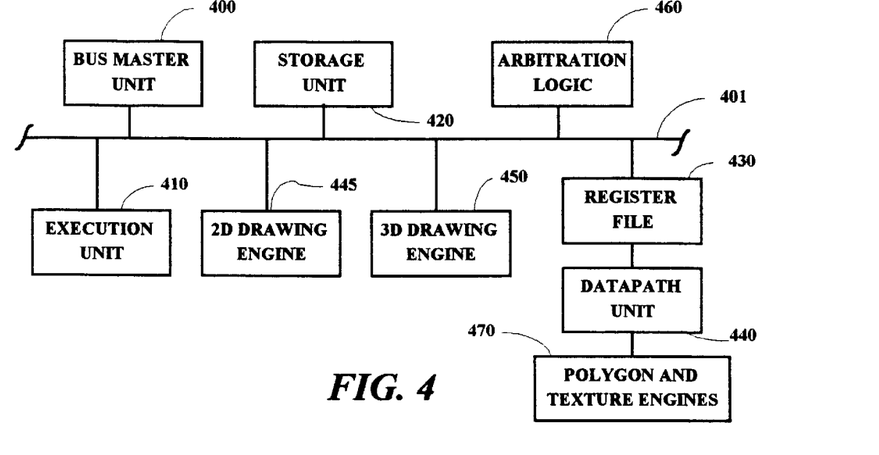
FIG. 4 is a simplified block diagram showing, in detail, portions of the graphics processor of FIG. 3.

Referring now to FIG. 4 the graphics rendering engine 150 preferably includes a bus master interface unit 400 coupled to an execution unit 410, a storage unit 420, a register file 430, datapath unit 440, 2D drawing engine 445, 3D drawing engine 450, arbitration logic unit 460 and polygon and texture engines 470. Although the arbitration logic unit 460 is shown in FIG. 4 as a separate unit, the arbitration logic unit 460 may easily be incorporated in other components of the graphics processor such as the datapath unit 440.

A bus master interface unit 400 provides interface to the system bus 25. Generally, the bus master interface unit 400 fetches instructions and the display list and loads the information into the storage unit 420 while the polygon and texture engines 470 are drawing from previously fetched instructions.

When the graphics processor 100 is in a bus master mode, the bus master interface unit 400 generates the system bus address for reading the display list from system memory 75 and then fills the storage unit 420 with the display list instructions and display list data. The bus master interface unit 400 also includes logic for enabling the graphics processor 100 to arbitrate for control of the system bus 25.

The execution unit 410 under the direction of the bus master interface unit 400 transfers the contents of the storage unit 420 to the register file 430 for rendering by the polygon and texture engines 470.

The execution unit 410 generally functions to set the control states for the graphics processor 100, and further synchronize operations of the graphics processor subcomponents. In the preferred embodiment as long as the RDRAM 85 is available, the execution unit 410 has the highest priority to continue processing data and instructions. Thus, the execution unit 410 is not interrupted while executing an instruction. The execution unit 410 is typically placed in an IDLE mode between each render instruction. In addition, the execution unit 410 suspends operation when a current executing instruction requires data from the system bus 25 or system memory 75. The execution unit 410 also includes logic to handle display list instructions provided by the bus master interface unit 400.

Still referring to FIG. 4, the register file 430 generally comprises registers for storing every primitive address value to render any primitive. Thus, to load a display list value into the appropriate registers in the register file 430, each value in the display list has an associated address corresponding to a register in the register file 430.

Once a set of display list values from the storage unit 420 is loaded into the register file 430, the primitive defined by those values is rendered by the polygon and texture engine 470. While the polygon and texture engine 470 are rendering the current primitive from the register file 430, the bus master interface unit 400 may receive a display list corresponding to the next primitive to be rendered and, if so, loads the display list into the storage unit 420.

The 2D drawing engine 445 typically receives and processes 2D primitive data and renders 2D graphics data to the display unit 60 (FIG. 2). In a preferred embodiment implemented in a 2D configured graphics system, the 2D drawing engine 445 has access priority to resources in the graphics processor 100, such as datapath unit 440, over other drawing engines in the graphics processor 100.

The 3D drawing engine 450 typically receives and processes 3D primitive data and renders 3D graphics data to the display unit 60 (FIG. 2). In a preferred embodiment implemented in a 3D configured graphics system, the 3D drawing engine 450 has access priority to resources in the graphics processor 100 over other drawing engines in the graphics processor 100.

Referring still to FIG. 4, the arbitration unit 460 is shown coupled to a bus 401. The arbitration unit 460 couples to the 2D drawing engine 445 and 3D drawing engine 450 to arbitrate access to graphics resources and sets priority to the 3D drawing engine, for example, over other drawing engines in the graphics processor. A detailed description of the arbitration logic unit 460 is provided with reference to FIG. 5.

Figure 5:
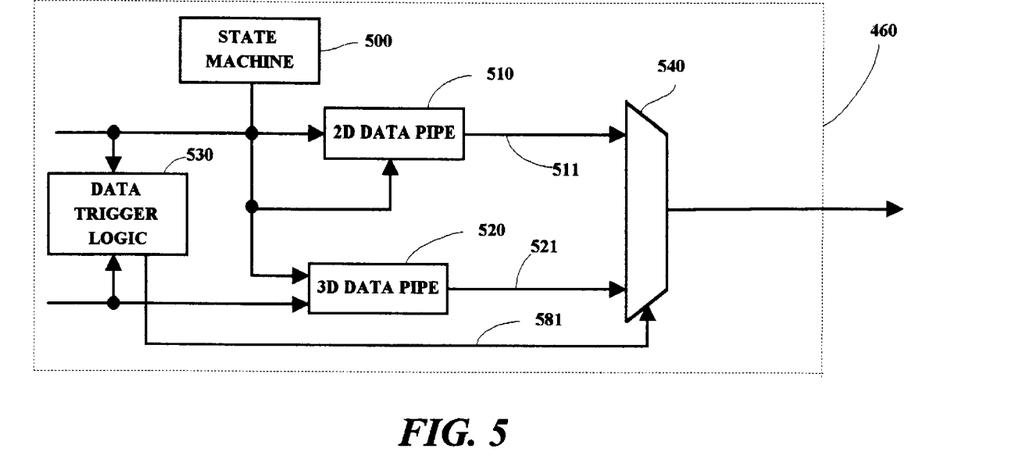
FIG. 5 is a block diagram showing an exemplary arbitration logic in accordance to the teachings of the present invention.

Referring now to FIG. 5, an embodiment of the arbitration logic unit 460 of the present invention is shown. The arbitration logic unit 460 comprises a state machine unit 500, a 2D data pipe 510, a 3D data pipe 520, a data trigger logic unit 530 and comparator logic 540.

Figure 6A:
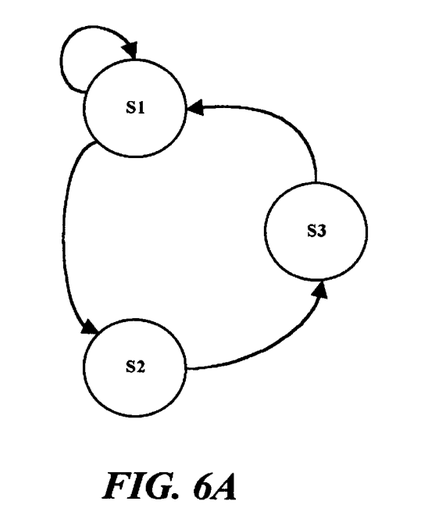
FIG. 6A and FIG. 6B are state diagrams for the state machines of FIG. 5.
Figure 6B:
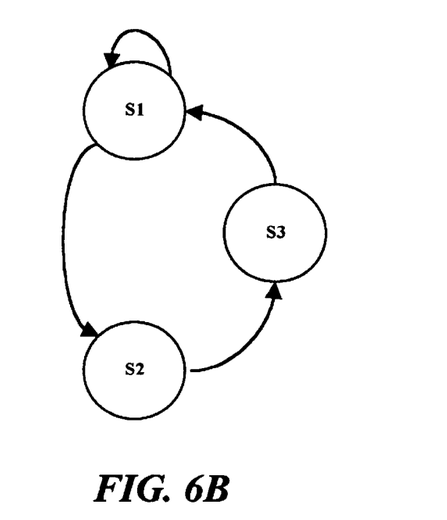

The state machine unit 500 is coupled to control and monitor operating states of the 2D drawing engine 445 and the 3D drawing engine 450. The state machine 500 includes a 2D state machine for controlling the operation of the 2D drawing engine 445 and a 3D state machine for controlling the operation of the 3D drawing engine 450. A detail description of the state machine unit 500 is provided with reference to FIG. 6 below.

The 2D data pipe 510 couples to the state machine 500 and the 2D drawing engine (FIG. 4) to receive 2D data bit values representing 2D primitives to be rendered in the graphics processor 100. The data provided to 2D data pipe 510 includes a priority data bit with may be set and reset to alter the priority of 2D data (and hence 2D data rendering) by the arbitration unit 460. In a 2D-configured computer system, the priority data bit in the 2D data pipe is always set at high priority when 2D data is present in the graphics processor 100. Thus, the 2D data is always rendered before any other type of graphics data (e.g. 3D data) is rendered.

In an example, the 2D data pipe 510 may preferably be a sixteen (16) bit wide register. However, other registers configurations may be used to achieve the objectives of the present invention. The 2D data pipe 510 is also coupled to trigger logic unit 530. The trigger logic unit monitors the 2D data pipe 510 to determine and detect the presence of data in the data pipe 510.

The 3D data pipe 520 couples to the state machine 500 to receive and process 3D data from the 3D drawing engine. The 3D data pipe couples to the state machine 500 and the 3D drawing engine (FIG. 4) to receive 3D data bit values representing 3D primitives to be rendered in the graphics processor 100. The data provided to 3D data pipe 520 includes a priority data bit with may be set and reset to alter the priority of 3D data (and hence 3D data rendering) by the arbitration unit 460.

In a 3D-configured computer system, the priority data bit in the 3D data pipe is always set at high priority when 3D data is present in the graphics processor 100. This means that the 3D data will be rendered before any other type of graphics data (e.g. 2D data) is rendered. In an example, the 3D data pipe may preferably be a sixteen (16) bit wide register. However, other registers may be used to achieve the objectives of the present invention.

The 3D data pipe 520 is coupled to trigger logic unit 530. The trigger logic unit 530 similarly monitors the 3D data pipe 520 to determine and detect the presence of data in the data pipe 520.

The data trigger logic unit 530 is coupled to the 2D pipe 510 and the 3D pipe 520 to monitor the presence of data in both data pipes. If the trigger logic 530 detects data present in the data pipes at the same time, then depending on the configuration of the computer system, the trigger logic unit 530 triggers comparator logic 540 to interrupt the processing of graphics data of one type over the other.

For example, in a 3D-configured computer system, the presence of 3D graphics data in the 3D pipe 520 while the 2D pipe 510 is passing data, will prompt the trigger logic 530 to signal the comparator logic over line 581 to interrupt the pass of 2D data to the rendering engine or other resources in the graphics processor such as datapath unit 440 (FIG. 4) in favor of passing the 3D data. In present invention, the trigger logic may be implemented either in software or hardware.

Still referring to FIG. 5, the comparator logic unit 540 is coupled to the 2D and 3D data pipes to receive data passed by the data pipes to the requested graphics resource in the graphics processor 100.

The comparator logic 540 logically compares the priority bits in the data provided by the data pipe via signal lines 511 and 521 to determine which data gets passed first to the requested graphics resource such as the datapath unit 440 (FIG. 4). For example, in a 2D-configured system, a priority bit comparison in comparator logic 540 will always have data from the 2D pipe 510 having a higher priority than data from the 3D pipe 520 and therefore will be passed to the requested graphics resource before data in the 3D pipe 520. Similarly in a 3D-configured system the data in the 3D pipe 520 will have higher priority over the data in the 2D pipe 510.

The comparator logic 540 also includes reset logic to reset the priority of data being passed from the data pipes after the contents of one pipe have been emptied. By arbitrating data access to requested graphics resources, comparator logic 540 allows 2D drawing engine 445 and 3D drawing engine 450 to arbitrarily access graphics resources in the graphics processor without losing any data.

Referring now to FIG. 6A and FIG. 6B, the state machine 500 is shown. As shown in FIG. 6, the state machine 500 preferably includes a 2D drawing engine state machine (FIG. 6A) and a 3D drawing engine state machine (FIG. 6B).

As shown in FIG. 6A, the 2D drawing engine state machine comprises three states of operation. A first state (S1) when the state machine is in an idle state. In the idle state, the 2D drawing engine is not processing any graphics data. The 2D state machine transitions into a second state (S2) when data is presented to the 2D data pipe 510 (FIG. 5) and the arbitration logic checks to determine whether the 3D drawing engine 450 is busy.

In a 2D-configured system, during state S2, the arbitration logic resets the priority of any other type of graphics data being processed (e.g., 3D data) to make way for the 2D data present in the arbitration logic unit 460. The state machine then transitions into state S3 where the presented 2D data is passed on to the requested graphics resource to be rendered or stored. The state machine then transitions back to state S1 into an idle state.

Referring to FIG. 6B, the 3D state machine is shown. As shown in FIG. 6B, the 3D drawing engine state machine comprises three states of operation. A first state (S1) exists when the state machine is in an idle state. In the idle state, the 3D drawing engine is not processing any graphics data. The 3D state machine transitions into a second state (S2) when data is presented to the 3D data pipe 520 (FIG. 5) and the arbitration logic 460 checks to determine whether the 3D drawing engine is busy.

In a 3D-configured system, during state S2, the arbitration logic resets the priority of any other type of graphics data being processed (e.g., 2D data) to make way for the 3D data present in the arbitration logic. The state machine then transitions into state S3 where the presented 3D data are passed on to the requested graphics resource to be rendered or stored. The state machine then transitions back to state S1 when no more 3D data are to be processed.

Figure 7:
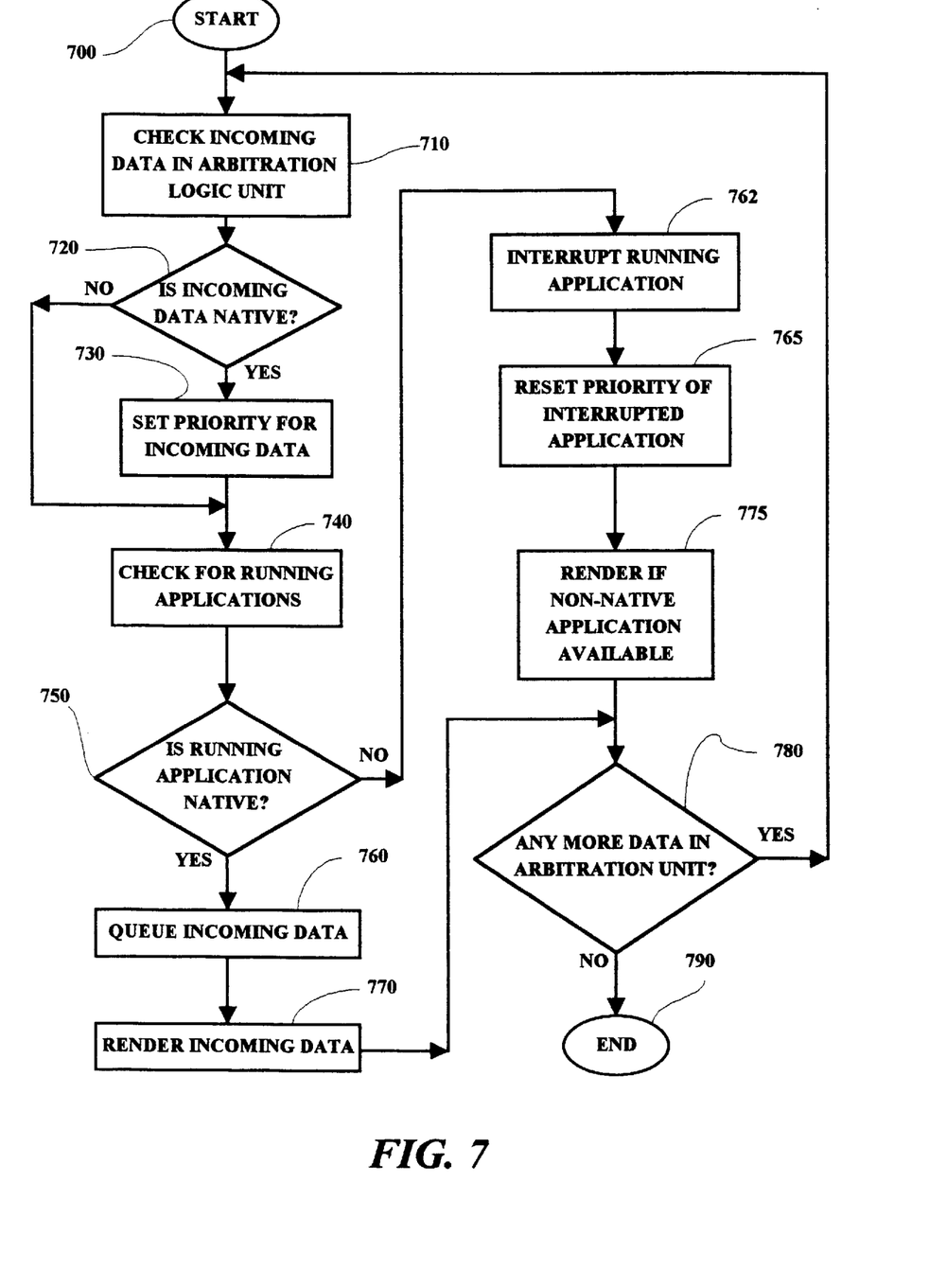
FIG. 7 is a flow diagram illustrating an exemplary operational flow sequence for one embodiment of the present invention.

With reference now to FIG. 7, a flow diagram of the operation of one embodiment of the arbitration logic of the present invention is shown. As shown in FIG. 7, the arbitration logic commences operation at processing step 700.

At processing step 710, the arbitration logic 460 detects the presence of incoming data in the graphics processor 100 for processing. The arbitration logic 460 proceeds to determine at processing step 720, whether the incoming data are native to the underlying computer system (e.g., whether the incoming data is 2D or 3D). If the incoming data is native to the underlying computer system, processing continues at processing step 730. However, if incoming data are not native, processing continues at processing step 740.

At processing step 730, after the arbitration logic has determined that the incoming data is native to the underlying computer system, the priority bit in the incoming data is set high and processing continues at processing step 740.

At processing step 740, the arbitration logic checks the data pipes (FIG. 5) to determine whether any other applications are currently running. If there is any application running, the arbitration logic checks at processing step 750 to see if the application(s) running is a native application.

If the application running is native to the underlying computer system, processing continues at processing step 760 where the incoming data is queued for processing. However, if the currently running application in non-native, the arbitration logic interrupts 762 the application to allow the incoming native data to be processed.

At processing step 765, the priority bit of the interrupted non-native application is reset to enable further processing.

At processing step 770, the arbitration logic grants the incoming native data priority to access a requested graphics resource to complete processing. And at processing step 775, the previously interrupted non-native application is processed if there are no more native data to be processed.

At processing step 780, the arbitration logic checks for the presence of any more data, both native and non-native, in the graphics processor. If any data are detected, processing continues at processing step 710. If no data are detected, processing ends at processing step 790 and the arbitration logic enters an idle state.

While the invention has been shown and described with reference to preferred embodiments thereof, it will be understood that various substitutions and changes in form and detail may be made by those skilled in the art without departing from the spirit and scope of the invention. Accordingly, the method and apparatus herein disclosed is to be considered merely as illustrative, and the scope of the invention is to be limited only as specified in the claims. It is intended that the following claims be interpreted to embrace all such modification and variations.

What is claimed is:

1. A graphics data rendering resource arbitration system comprising:
   a two dimensional data pipe for storing two dimensional graphics data;
   a three dimensional data pipe for storing three dimensional graphics data;
   a comparator logic coupled to the two dimensional data pipe and the three dimensional data pipe for determining the priority of the two dimensional graphics data and the three dimensional graphics data respectively, said comparator logic including means for selectively setting resource access priority to the two dimensional data pipe or the three dimensional data pipe depending upon system configuration; and
   a rendering state machine coupled to the comparator logic for logically controlling various graphics rendering operational states in the two dimensional pipe and the three dimensional pipe,
   wherein the comparator logic arbitrates access to shared graphics resources by the two dimensional data pipe and the three data dimensional pipe, respectively.

2. The graphics data rendering resource arbitration system of claim 1, wherein the resource access priority is determined by a bit setting in said comparator logic.

3. The graphics data rendering resource arbitration system of claim 1, wherein the two dimensional data pipe is prioritized over the three dimensional data pipe.

4. The graphics data rendering resource arbitration system of claim 3, wherein the state machine includes a two dimension state machine for controlling graphics data rendering operations in the two dimension data pipe.

5. The graphics data rendering resource arbitration system of claim 1, wherein the three dimension data pipe is prioritized over the two dimension data pipe.

6. The graphics data rendering resource arbitration system of claim 4, wherein the state machine further includes a three dimensional state machine for controlling graphics data rendering operations in the three dimension data pipe.

7. A computer system comprising:
   a system bus coupled for communicating data and instructions;
   a host processor coupled to the system bus for processing the data and the instructions; and
   a graphics processor coupled to the system bus for processing graphics data and instructions, the graphics processor comprising:
   a two dimensional graphics data rendering engine for rendering two dimensional graphics objects,
   a three dimensional graphics rendering engine for rendering three dimensional graphics objects, and
   a resource arbitration means coupled to the two dimensional graphics rendering engine and the three dimensional graphics rendering engine for arbitrating graphics resource access to the two dimensional graphics rendering engine and the three dimensional graphics rendering engine, respectively, in the graphics processor, said resource arbitration means including means for selectively setting resource access priority to the two dimensional graphics rendering engine or the three dimensional graphics rendering engine depending upon system configuration.

8. The computer system of claim 7, the resource arbitration means includes a two dimensional graphics data pipe.

9. The computer system of claim 8, wherein the resource arbitration means further includes a three dimensional graphics data pipe.

10. The computer system of claim 9, wherein the resource arbitration means includes comparator logic coupled to the two dimensional graphics data pipe and the three dimensional graphics data pipe for determining access priority by the two dimensional graphics data pipe and the three dimensional graphics data pipe to the graphics resource.

11. The computer system of claim 10, wherein the resource arbitration means further includes a two dimensional state machine coupled to the comparator logic to control operational states of the two dimension graphics engine.

12. The computer system of claim 11, wherein the resource arbitration means further includes a three dimensional state machine coupled to the comparator logic to control operational states of the three dimension graphics engine.

13. The computer system of claim 12, wherein the resource arbitration means further includes a priority resetting logic for re-proritizing graphics data stored in the two dimensional graphics data pipe and the three dimensional graphics data pipe, respectively.

14. A graphics processor comprising:
   a two dimensional (2D) graphics drawing engine;
   a three dimensional (3D) graphics drawing engine;
   a resource arbitration means; and
   a shared graphics resource means, said shared graphics resource means being responsive to said resource arbitration means for sharing graphics resources based upon a predetermined prioritization between said two-dimensional graphics drawing engine and said three-dimensional graphics drawing engine, said resource arbitration means including means for selectively setting resource access priority to the two dimensional graphics drawing engine or the three dimensional graphics drawing engine depending upon system configuration.

15. The graphics processor of claim 14, wherein the resource arbitration means includes comparator means for determining the priority of data stored in the two dimensional engine and the three dimensional engine.

16. The graphics processor of claim 15, wherein the resource arbitration means includes a 2D graphics data pipe responsive to the 2D graphics drawing engine to store 2D graphics data.

17. The graphics processor of claim 16, wherein the resource arbitration means further includes a 3D graphics data pipe responsive to the 3d graphics drawing engine to store 3d graphics data.

18. The graphics processor of claim 17, wherein the 2D graphics data includes a priority bit which is set to prioritize data access to the shared graphics resource means.

19. The graphics processor claim 18, wherein the 3D graphics data includes a priority bit which is set to prioritize data access to the shared graphics resource means.

20. The graphics processor of claim 19, wherein the 2D graphics data pipe is a sixteen (16) bit size register.

21. The graphics processor of claim 20, wherein the 3D graphics data pipe is a sixteen (16) bit size register.

22. The graphics processor of claim 21, wherein the resource arbitration means further includes a trigger logic which triggers the 2D graphics data pipe and the 3D graphics data pipe responsive to the presence of data simultaneously in the 2D graphics data pipe and the 3d graphics data pipe respectively.

23. The graphics processor of claim 22, wherein the shared graphics resource means is a datapath unit.

24. The graphics processor of claim 23, wherein the shared graphics resource means is a shared graphics rendering engine.

25. The graphics processor of claim 24, wherein the resource arbitration means further includes reset logic for resetting the priority of the data stored in the 2D graphics data pipe after the data stored in the 3D graphics data pipe have been processed.

26. The graphics processor of claim 25, wherein the resource arbitration means further includes reset logic for resetting the priority of the data stored in the 3D graphics data pipe after the data stored in the 2D graphics data pipe have been processed.

27. The graphics processor of claim 26, wherein the resource arbitration means includes a state machine.

28. The graphics processor of claim 27, wherein the state machine includes a 2D state machine for controlling operation states of the 2D graphics drawing engine.

29. The graphics processor of claim 27, wherein the state machine includes a 3D state machine for controlling operation states of the 3D graphics drawing engine.

30. The graphics processor of claim 29, wherein the 2D graphics data pipe and the 3D graphics data pipe are 12 bit size registers respectively.

31. The graphics processor of claim 30, wherein the 2D graphics data pipe and the 3D graphics data pipe are 8 bit size registers respectively.

32. In a computer graphics system having a graphics processor with a plurality of dissimilar graphics drawing engines and shared graphics resources, a method for arbitrating data access to the shared graphics resources to the plurality of dissimilar drawing engines, the method comprising the steps of:

(a) fetching graphics data responsive to one of the dissimilar drawing engines from an external source for processing in an arbitration logic;

(b) determining whether there is graphics data already present in the arbitration logic;

(c) priority setting the processing priority of the fetched graphics data in relation to the already present graphics data in the arbitration logic; and (d) setting the priority of the fetched graphics data higher than the priority of the already present graphics data in the arbitration logic if the fetched graphics data are of a type similar to the underlying computer graphics system and the already present graphics data are not of a type similar to the underlying computer graphics system; and (e) processing the fetched graphics data.

33. The method of claim 32, wherein the determining step (b) comprises the step of determining whether the graphics data present in the arbitration logic prior to the fetching step (a) are of a graphics type similar to the underlying computer graphics system.

34. The method of claim 33, wherein the graphics type is a two dimensional (2D) graphics.

35. The method of claim 33, wherein the graphics type is a three dimensional (3D) graphics type.

36. The method of claim 35, wherein the priority setting step (c) comprises the step of determining whether the fetched graphics data are of a graphics type similar to the underlying computer graphics system.

37. The method of claim 36 further comprises the step of determining whether there are any more data left in the arbitration logic to be processed after the fetched graphics data have been prioritized and processed.

* * * * *